United States Patent
Hall et al.

(10) Patent No.: US 10,174,842 B2
(45) Date of Patent: Jan. 8, 2019

(54) AGITATOR SHAFT SEAL ASSEMBLY FOR INDUSTRIAL MIXERS

(71) Applicant: SHAFFER MANUFACTURING CORPORATION, Urbana, OH (US)

(72) Inventors: Michael W. Hall, Sidney, OH (US); Kirk Lang, Powell, OH (US)

(73) Assignee: Shaffer Manufacturing Corporation, Urbana, OH (US)

(*) Notice: Subject to any disclaimer, the term of this patent is extended or adjusted under 35 U.S.C. 154(b) by 131 days.

(21) Appl. No.: 15/155,888

(22) Filed: May 16, 2016

(65) Prior Publication Data
US 2017/0325465 A1 Nov. 16, 2017

(51) Int. Cl.
*F16J 15/00* (2006.01)
*A21C 1/06* (2006.01)

(52) U.S. Cl.
CPC .............. *F16J 15/00* (2013.01); *A21C 1/06* (2013.01)

(58) Field of Classification Search
CPC ...................................................... F16J 15/00
See application file for complete search history.

(56) References Cited

U.S. PATENT DOCUMENTS

| | | | | |
|---|---|---|---|---|
| 2,395,095 A | * | 2/1946 | Brady, Jr. | F16J 15/36 277/393 |
| 2,828,983 A | * | 4/1958 | Hunt | F16J 15/3488 277/370 |
| 5,192,085 A | * | 3/1993 | McOnie | F16J 15/3476 277/370 |
| 5,403,020 A | * | 4/1995 | McOnie | F16J 15/3476 277/390 |
| 6,848,689 B2 | * | 2/2005 | Auber | F16J 15/3464 277/358 |
| 7,827,665 B2 | * | 11/2010 | Happel | B28B 23/0043 249/63 |
| 8,753,079 B2 | * | 6/2014 | Abarca Melo | F04D 29/126 277/371 |
| 9,546,734 B2 | * | 1/2017 | Cid | F16J 15/3452 |
| 2010/0301566 A1 | * | 12/2010 | van Schoor | B63H 23/321 277/549 |
| 2013/0076020 A1 | * | 3/2013 | Lucey | F16L 19/065 285/123.12 |
| 2014/0132000 A1 | * | 5/2014 | Ben-Horin | F16K 27/0218 285/373 |

* cited by examiner

*Primary Examiner* — Abbas Rashid
(74) *Attorney, Agent, or Firm* — Frost Brown Todd LLC

(57) ABSTRACT

An agitator shaft seal assembly for use on industrial mixers, particularly horizontal dough mixers, that includes a stator plate that is adapted to be mounted on a rotary seal adapter plate; a rotor mounted on the stator plate; a push ring mounted on the rotor; a seal gland disposed between the rotor and the push ring; and a locking ring mounted on the push ring.

13 Claims, 3 Drawing Sheets

AGITATOR SHAFT SEAL ASSEMBLY FOR INDUSTRIAL MIXERS

BACKGROUND OF THE INVENTION

The described invention relates in general to seals and sealing assemblies, systems, devices, and methods, and more specifically to an agitator shaft seal assembly for use with large-scale industrial mixers such as the horizontal mixers that are used for processing bread and cookie dough.

Industrial mixers and blenders are typically used to mix or blend a wide range of materials used in different industries including the food, chemical, pharmaceutical, plastic and mineral industries. Mixers are machines that blend, homogenize, emulsify or otherwise mix materials and substances into a single substance by thoroughly combining virtually any solid or liquid that is necessary to form a final product. Specific examples of industrial mixers include dry blending devices, paste mixing designs for high viscosity products, and high shear models for emulsification, particle size reduction and homogenization. Industrial mixers range from laboratory to production line scale, and though mixers vary by size and design, the majority of these devices include large tanks, vats, or mixing bowls in which motorized blades or paddles rotate on or around one or more agitator shafts. Mixers are commonly constructed from stainless steel due to the desirable sanitary and corrosion-resistant properties of this metal, although other materials such as thermoplastics, titanium, cast iron, or aluminum may be used.

Because industrial mixers, when in use, often contain substances that must not be contaminated or lost during processing, various seals or sealing assemblies are included on certain components of these mixers. Of particular importance are the seals mounted on the exterior of the mixing reservoir or bowl around the ends of agitator shafts that protrude through walls of the mixing reservoir or bowl. Two commonly used seals of this nature include radial shaft seals (also referred to as "lip seals") and rotary seals. Radial shaft seals are used to seal rotary elements, such as a shaft or rotating bore, and generally include a rubber or elastomeric sealing lip, a metal case, and a garter spring. Rotary seals are designed in the form of a ring and are fitted between machine parts in relative rotation.

With regard to their use on industrial-scale horizontal mixers that are used for processing bread, cookie dough, and other materials and substances, both radial shaft seals and rotary seals suffer from significant limitations. For example, lips seal used on agitator shafts are known to wear grooves into the shafts over time, eventually necessitating replacement of the agitator shafts. Lip seals used on agitator shafts are also difficult to disassemble and clean and include small springs that may come loose and contaminate the product being mixed. Lip seals are also known to leak dough and water. Rotary seals used on agitator shafts are also difficult to disassemble and clean because they are mechanically complex and include numerous individual parts that must be removed, cleaned, and replaced. Rotary seals are difficult to reassemble in a manner that will consistently provide positive sealing, and if such seals are reassembled incorrectly, the seals may overheat and sustain damage. Rotary seals are also designed and sold for a variety of machines, most of which do not require the level of sanitation needed for dough mixers. Some rotary seals rely on compressed air to maintain the seal, and compressed air is a possible source of product contamination. Air also leaks out of the seals, wasting energy. Finally, most rotary seals have an enclosed cavity that can collect leaked dough, but cannot be visually inspected for contamination without taking the seal apart. Accordingly, there is an ongoing need for a more effective and loss problematic seal and/or seal assembly that can be used with horizontal dough mixers and other industrial mixers.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first agitator shaft seal assembly for use on industrial mixers is provided. This seal assembly includes a stator plate, wherein the stator plate is adapted to be mounted on a rotary seal adapter plate; a rotor mounted on the stator plate; a push ring mounted on the rotor; a seal gland disposed between the rotor and the push ring; and a locking ring mounted on the push ring.

In accordance with another aspect of the present invention, a second agitator shaft seal assembly for use on industrial mixers is provided. This seal assembly includes a substantially circular stator plate, wherein the substantially circular stator plate is adapted to be mounted on a rotary seal adapted plate; a substantially circular rotor mounted on the stator plate; a substantially circular push ring mounted on the rotor; a substantially circular seal gland disposed between the rotor and the push ring; and a substantially circular locking ring mounted on the push ring.

In yet another aspect of this invention, a third agitator shaft seal assembly for use on industrial mixers is provided. This seal assembly includes a substantially circular stator plate, wherein the substantially circular stator plate is adapted to be mounted on a rotary seal adapted plate; a substantially circular rotor mounted on the stator plate, wherein the substantially circular rotor includes a top portion and a bottom portion; a substantially circular push ring mounted on the rotor, wherein the substantially circular push ring includes a top portion and a bottom portion; a substantially circular seal gland disposed between the rotor and the push ring; and a substantially circular locking ring mounted on the push ring, wherein the substantially circular locking ring includes a top portion and a bottom portion.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
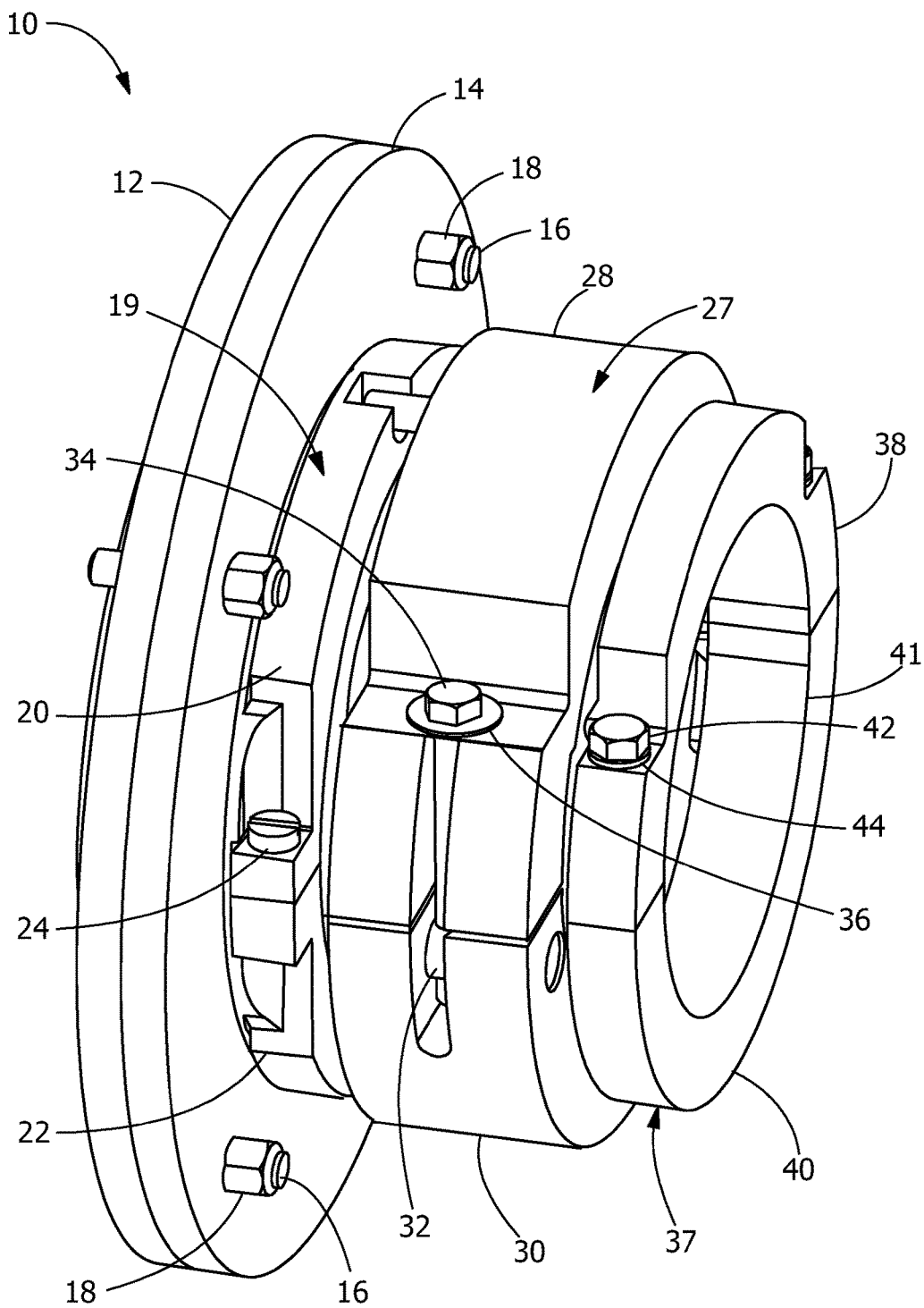
FIG. 1 is a first perspective view of a seal assembly in accordance with an exemplary embodiment of the present invention.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

As previously indicated, the present invention relates in general to seals and sealing assemblies, systems, devices, and methods, and more specifically to an agitator shaft seal assembly for use with large-scale industrial mixers such as the horizontal mixers that are used for processing bread and cookie dough. This invention offers significant advantages over prior art systems and devices such as, for example: (i) a simple, sanitary design; (ii) positive air pressure is not required; (iii) the seal assembly may be easily cleaned by removing only three parts; (iv) ease of disassembly and ease of reassembly; (v) when reassembled, the location of all parts is predetermined so that consistent sealing may be obtained; (vi) the seal is a rotary type seal; therefore, no damage is done to the agitator shaft; and (vii) no enclosed cavities that cannot be visually inspected for dough leakage are included. With reference now to the Figures, one or more specific embodiments of this invention are described in greater detail.

Figure 2:
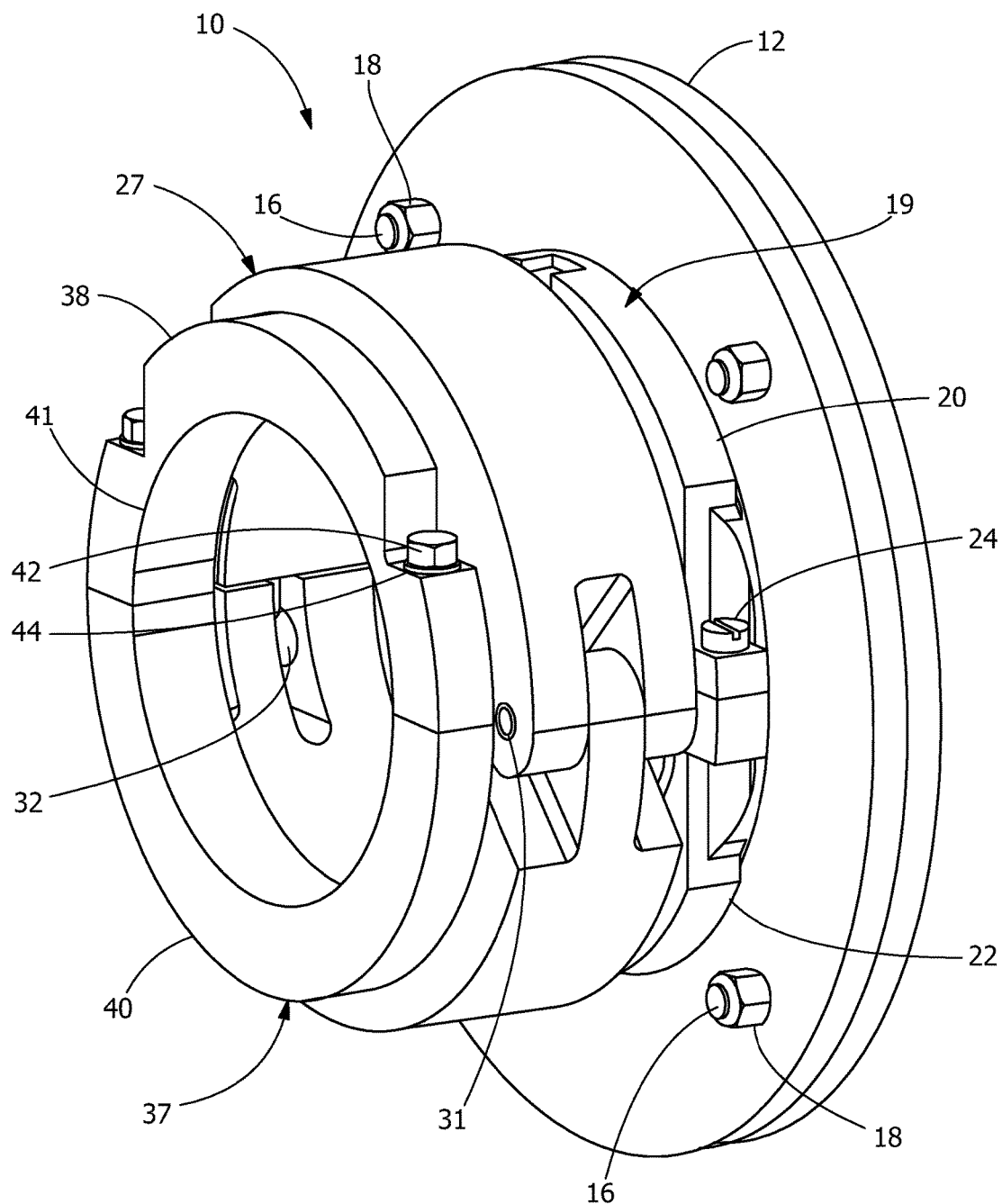
FIG. 2 is a second perspective view of a seal assembly in accordance with an exemplary embodiment of the present invention showing the opposite side of the seal assembly of FIG. 1.
Figure 3:
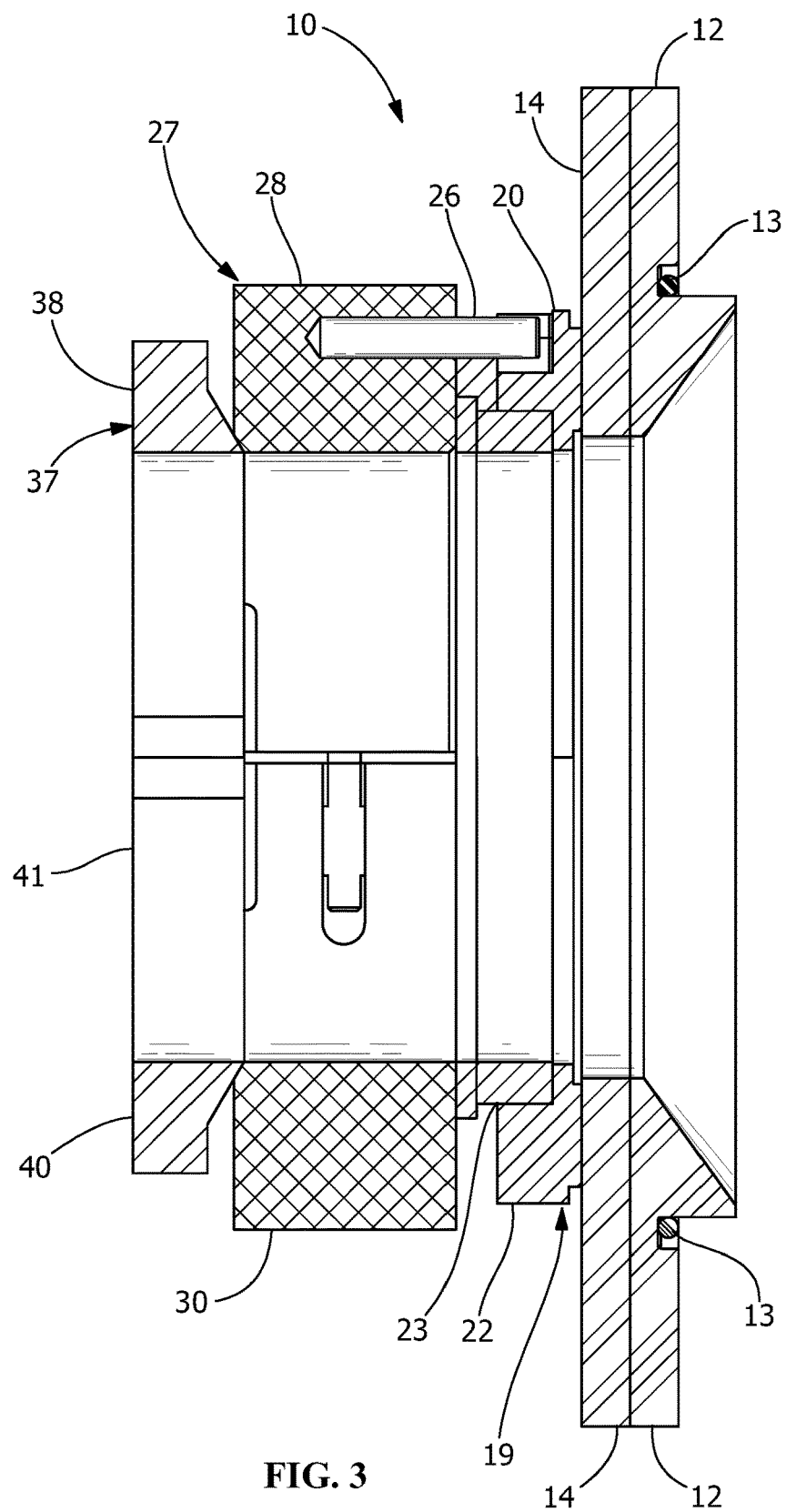
FIG. 3 is a cross-sectional side view of the seal assembly of FIG. 2.

FIG. 1 provides a first perspective view of a seal assembly in accordance with an exemplary embodiment of the present invention; FIG. 2 provides a second perspective view of a seal assembly in accordance with an exemplary embodiment of the present invention showing the opposite side of the seal assembly of FIG. 1; and FIG. 3 provides a cross-sectional side view of the seal assembly of FIG. 2. As shown in these Figures, agitator shaft sealing assembly 10 includes outer rotary seal stator plate 14, which is adapted to be mounted on rotary seal adapter plate 12, behind which oil-resistant O-ring 13 is located; rotor 19, which is mounted on outer rotary seal stator plate 14; push ring 27, which is mounted on rotor 19; inner seal gland 23, which is disposed between rotor 19 and push ring 27 and which includes a split formed therein; and locking ring 37, which is mounted on push ring 27. Threaded studs or rods 16 and nylon insert hex locknuts 18 are used to connect outer rotary seal stator plate 14 to rotary seal adapter plate 12. Rotor 19 includes top portion 20 and bottom portion 22 and connectors 24 are used to attach these portions to one another. Push ring 27 includes a top portion 28 and a bottom portion 30, which are connected to one another by hinge 31 and held together by clamp pin 32, clamp screw 34, and flat washer 36. Dowel pin or drive pin 26 extends between rotor 19 and push ring 27. Locking ring 37 includes top portion 38 and bottom portion 40, which define aperture 41 from which the agitator shaft of a dough mixer exits sealing assembly 10. Top portion 38 and bottom portion 40 of locking ring 37 are connected to one another by hex head cap screws 42 and lock washers 44.

Each agitator shaft sealing assembly 10 is used to seal a mixing bowl where an agitator shaft extends through the end of the bowl to its exterior. Dough mixers typically include two or four agitator shaft sealing assemblies 10, depending on the mixer type. When agitator shaft sealing assembly 10 is mounted on a mixing bowl, rotor 19 contacts and rubs stator plate 14, which is fixed. Stator plate 14 mounts on rotary seal adapter plate 12, which functions as a gasket. This type of seal is referred to as a "face seal". Push ring 27, which is hinged, clamps to an agitator shaft using clamp pin 32, clamp screw 34, and flat washer 36. Push ring 27 rotates with the agitator shaft. Drive pin 26 is mounted to push ring 27 and engages a slot in rotor 19, which permits rotor 19 to rotate with push ring 27 and the agitator shaft. Rotor 19 is typically made from a hard plastic or similar material. Stator plate 14 is typically made from stainless steel and is attached to the end of the mixing bowl. Stator plate 14 does not rotate with the agitator shaft.

Sealing is provided by surface pressure at the face of the rotor 19 and stator plate 14 and proper or appropriate sealing pressure is determined by the location of locking ring 37. As push ring 27 is clamped over the agitator shaft, the tapers formed on the rear portion of locking ring 37 (see FIG. 3) and the corresponding tapered surfaces formed on push ring 27 force push ring 27 to move over and against inner seal gland 23. Inner seal gland 23 expands, resulting in a seal formed around the agitator shaft. Inner seal gland 23 also pushes on rotor 19, resulting in surface pressure at rotor 19 and stator plate 14 for providing sealing.

Agitator shaft sealing assembly 10 may be easily disassembled and cleaned according to the following procedure: (i) loosen clamp screw 34 without completely detaching the clamp screw from clamp pin 32; (ii) swing clamp screw 34 out of the slot in which it sits within push ring 27; (iii) remove push ring 27 and clean with a mild detergent in water; (iv) remove inner seal gland 23 and clean with a mild detergent in water; (v) slide rotor 19 over the agitator shaft away from stator plate 14, but do not remove rotor 19; and (vi) clean rotor 19 in place with a mild detergent in water. Screws 42 in locking ring 37 should not be loosened or removed during the cleaning process because locking ring 37 is factory pre-set to assure proper seal functionality.

Agitator shaft sealing assembly 10 may be easily assembled according to the following procedure: (i) assure that the faces of stator plate 14 and rotor 19 that contact each other are clean; (ii) slide rotor 19 against stator plate 14; (iii) install inner seal gland 23 in rotor 19 assuring that the split in inner seal gland 23 is properly closed and that inner seal gland 23 is inserted in rotor 19 completely around the agitator shaft; and (iv) install push ring 27 over the agitator shaft being certain that drive pin 26 is properly aligned with the corresponding slot in rotor 19. If clamp screw 34 has been loosened to draw the two portions of push ring 27 together, tighten the clamp screw such that the push ring is clamped onto the agitator shaft.

Other embodiments of this invention include different arrangements for mounting agitator shaft sealing assembly 10 on the mixing bowl of an industrial mixer. With reference to the Figures, in an alternate embodiment, rotary seal adapter plate 12 and oil-resistant O-ring 13 are not present and outer rotary seal stator plate 14 directly contacts the end of the mixing bowl where it is retained with threaded studs or rods 16 and nylon insert hex locknuts 18. In still another embodiment, rotary seal adapter plate 12 and oil-resistant O-ring 13 are not present and locknuts 18 are not utilized.

Studs or rods 16 are not threaded in this embodiment, but rather include a rounded geometry. Outer rotary seal stator plate 14 is prevented from rotating by round rods 16 and is held against the end of mixing bowl by the force of rotor 19, which pushes on outer rotary seal stator plate 14. With this embodiment, the entire agitator shaft sealing assembly 10, including outer rotary seal stator plate 14, may be disassembled by loosening screw 42.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. An agitator shaft seal assembly for use on industrial mixers, comprising:
   (a) a stator plate, wherein the stator plate is adapted to be mounted on a rotary seal adapter plate;
   (b) a rotor mounted on the stator plate;
   (c) a push ring mounted on the rotor, wherein the push ring includes a top portion and a bottom portion that are connected by a hinge to one another on one side of the push ring, and wherein the top portion and bottom portion of the push ring are secured to one another by a clamp pin on a side of the push ring opposite the hinge;
   (d) a seal gland disposed between the rotor and the push ring; and
   (e) a locking ring mounted on the push ring.

2. The agitator shaft seal assembly of claim 1, further including a single drive pin disposed between and connected to both the rotor and the push ring for allowing the rotor and the push ring to rotate together.

3. The agitator shaft seal assembly of claim 1, wherein the rotor includes a top portion and a bottom portion that are detachably connected to one another by two connectors.

4. The agitator shaft seal assembly of claim 1, wherein the seal gland further includes a split formed therein.

5. The agitator shaft seal assembly of claim 1, wherein the locking ring includes a top portion and a bottom portion that are detachably connected to one another by two screws.

6. An agitator shaft seal assembly for use on industrial mixers, comprising:
   (a) a circular stator plate, wherein the circular stator plate is adapted to be mounted on a rotary seal adapted plate;
   (b) a circular rotor mounted on the stator plate;
   (c) a circular push ring mounted on the rotor, wherein the push ring includes a top portion and a bottom portion that are connected by a hinge to one another on one side of the push ring, and wherein the top portion and the bottom portion of the push ring are secured to one another by a clamp pin on a side of the push ring opposite the hinge;
   (d) a circular seal gland disposed between the rotor and the push ring; and
   (e) a circular locking ring mounted on the push ring.

7. The agitator shaft seal assembly of claim 6, further including a single drive pin disposed between and connected to both the rotor and the push ring for allowing the rotor and the push ring to rotate together.

8. The agitator shaft seal assembly of claim 1, wherein the rotor includes a top portion and a bottom portion that are detachably connected to one another by two connectors.

9. The agitator shaft seal assembly of claim 1, wherein the seal gland further includes a split formed therein.

10. The agitator shaft seal assembly of claim 1, wherein the locking ring includes a top portion and a bottom portion that are detachably connected to one another by two screws.

11. An agitator shaft seal assembly for use on industrial mixers, comprising:
    (a) a circular stator plate, wherein the circular stator plate is adapted to be mounted on a rotary seal adapted plate;
    (b) a circular rotor mounted on the stator plate, wherein the circular rotor includes a top portion and a bottom portion, wherein the top portion and the bottom portion of the rotor are detachably connected to one another by two connectors positioned opposite one another on the rotor;
    (c) a circular push ring mounted on the rotor, wherein the circular push ring includes a top portion and a bottom portion connected by a hinge to one another on one side of the push ring, and wherein the top portion and the bottom portion of the push ring are secured to one another by a clamp pin on a side of the push ring opposite the hinge;
    (d) a circular seal gland disposed between the rotor and the push ring; and
    (e) a circular locking ring mounted on the push ring, wherein the circular locking ring includes a top portion and a bottom portion, and wherein the top portion and the bottom portion of the locking ring are detachably connected to one another by two screws positioned opposite one another on the locking ring.

12. The agitator shaft seal assembly of claim 11, further including a single drive pin disposed between and connected to both the rotor and the push ring for allowing the rotor and the push ring to rotate together.

13. The agitator shaft seal assembly of claim 11, wherein the seal gland further includes a split formed therein.

* * * * *